United States Patent [19]

Valyi

[11] 4,013,748

[45] * Mar. 22, 1977

[54] METHOD FOR MAKING COMPOSITE PLASTIC ARTICLE

[76] Inventor: Emery I. Valyi, 5200 Sycamore Ave., Riverdale, N.Y. 10471

[ * ] Notice: The portion of the term of this patent subsequent to Mar. 6, 1991, has been disclaimed.

[22] Filed: July 2, 1973

[21] Appl. No.: 375,824

Related U.S. Application Data

[63] Continuation-in-part of Ser. No. 213,914, Dec. 30, 1971, abandoned.

[52] U.S. Cl. .................................. 264/90; 264/97; 264/102; 264/266; 425/DIG. 234
[51] Int. Cl.$^2$ ..................... B29C 17/07; B29D 3/00
[58] Field of Search .............. 264/89, 90, 92, 94, 264/97, 246, 247, 255, 250, 275, 102, DIG. 78, 266; 425/129, 112, 242 B, 387 B, 324 B, 812, DIG. 209, DIG. 234

[56] References Cited

UNITED STATES PATENTS

| | | | |
|---|---|---|---|
| 3,122,598 | 2/1964 | Berger | 264/247 |
| 3,247,550 | 4/1966 | Haines, Jr. | 264/275 X |
| 3,358,062 | 12/1967 | Lemelson | 264/98 X |
| 3,476,852 | 11/1969 | Shattuck | 425/129 X |
| 3,719,735 | 3/1973 | Valyi | 264/97 X |

FOREIGN PATENTS OR APPLICATIONS 1,231,866  10/1960  France .............................. 264/247

Primary Examiner—Jan H. Silbaugh
Attorney, Agent, or Firm—Robert H. Bachman

[57] ABSTRACT

A method for making composite plastic containers in which a preformed sleeve is caused to expand with a plastic layer in the course of an injection blow molding operation and to adhere, upon expansion, to said plastic layer due to atmospheric pressure acting on the inside of said sleeve without an opposing pressure on the outside thereof.

14 Claims, No Drawings

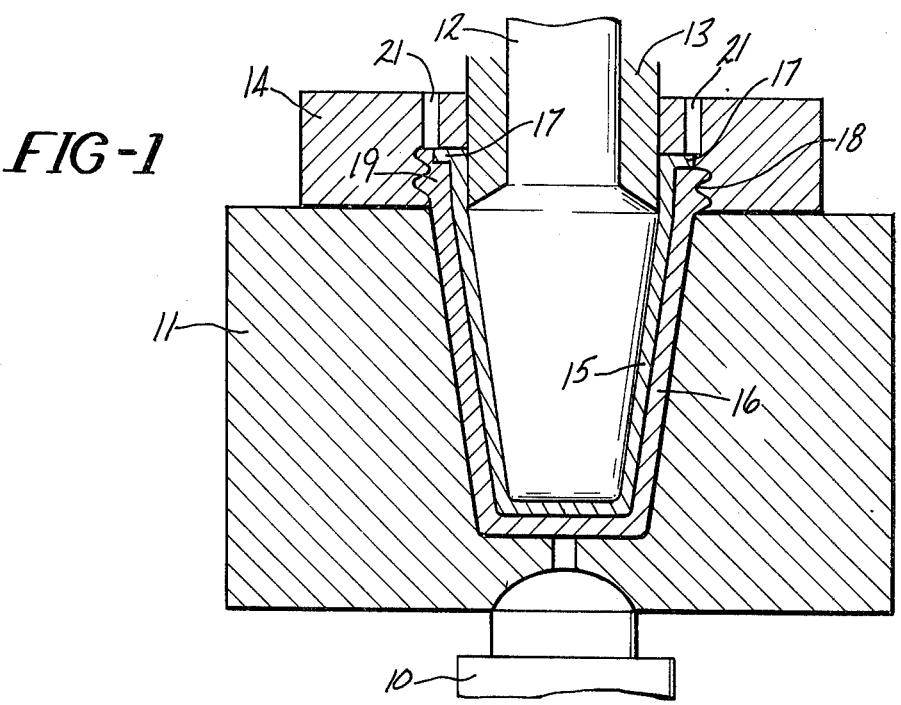
FIG-1
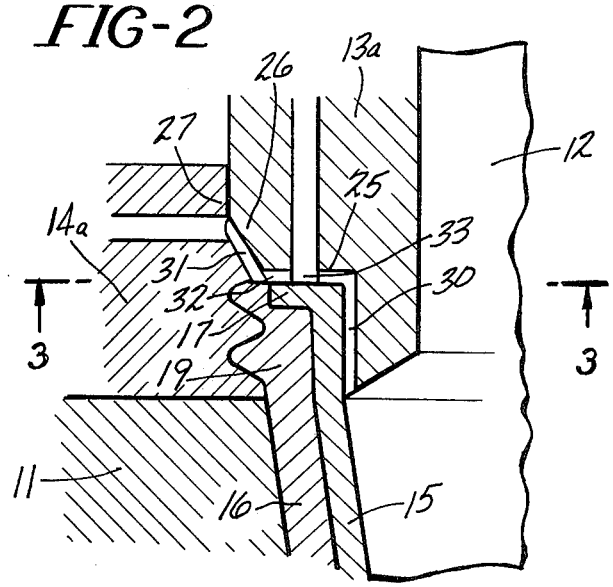
FIG-2
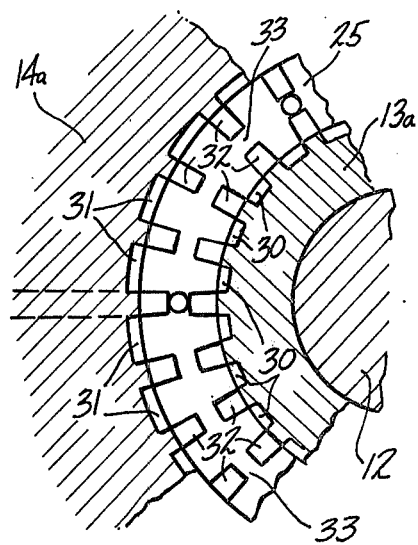
FIG-3
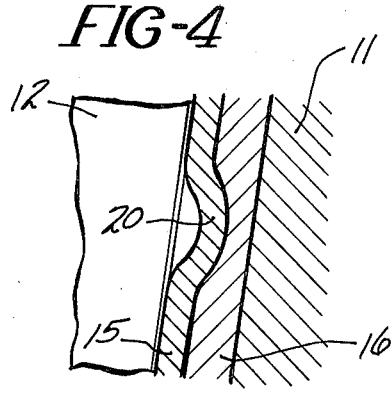
FIG-4
FIG-5

METHOD FOR MAKING COMPOSITE PLASTIC ARTICLE

CROSS REFERENCE TO RELATED APPLICATIONS

This application is a continuation-in-part of copending application Ser. No. 213,914 for "Composite Plastic Article and Method For Making Same" filed Dec. 30, 1971 by Emery I. Valyi, now abandoned.

BACKGROUND OF THE INVENTION

This invention relates to improvements in the manufacture of composite containers and the like of the type wherein the containers are made by an injection blow molding process wherein a preformed liner is placed upon the core, before injection of an outer plastic layer to form a composite parison which is subsequently expanded by internal pressure into the desired form in the manner customary in injection blow molding, the liner and the injected portion of the parison being held at a temperature appropriate for the desired deformation.

More specifically, the invention relates to the production of a novel and improved composite article, consisting of at least two layers of plastic having different properties. Thus, the inner layer may exhibit high resistance to permeation by gases, or solvents, while the outer layer exhibits high mechanical strength at low cost.

It has been heretofore attempted to produce said composite articles by uniting the two layers, such as by heat sealing or solvent bonding. It was found to be difficult to accomplish this purpose, because the two or more layers of plastic usually exhibited different heat expansion and contraction characteristics, which at times resulted in the separation of the several layers whenever the composite article was exposed to changes of temperature, either in the course of manufacture or in subsequent use. The product exhibiting such expansion would be inferior because the two or more layers thereof could not rely on each other for mutual support when exposed to external loads.

At other times, it was found in connection with plastics having well matched expansion properties, that have been caused to weld together, such as by interposition of an adhesive, that the fully, i.e., chemically joined composite assumed the mechanical properties of that layer which was the weakest, a property well known to be typical of composite products made up of layers of different materials. For example, a rupture in either layer tended to be transferred to the adjacent layer.

It is an object of this invention to provide a novel method for the manufacture of a composite article made of several layers of different plastics in which ambient atmospheric pressure is fully utilized to cause the layers to adhere one to the other, to assist the bonding of said layers, such as by welding or by the use of adhesives or to replace such bonding.

It is another object to provide a novel method for the manufacture of composite articles in which several layers, while held together over substantially their entire contacting areas by internal pressure, are nevertheless independent of each other and therefore capable of withstanding their respective ultimate loads.

SUMMARY OF THE INVENTION

In accordance with the present invention, a preformed liner is placed over a core and a layer of plastic is pressure molded therearound. Care is taken in the course of the injection molding step not to entrap any air between the liner and the injected layer. In one embodiment, the molding apparatus is provided with suitable vents arranged to permit any air entrapped between the liner and the core, or between the liner and the plastic to be progressively vented as the injection proceeds.

The liner itself is shaped so as to tend to remain in full contact with the core during the injection step and may have a shape at its open end capable of being imbedded in the pressure molded layer so as to seal the parts against subsequent entrance of air between the liner and the plastic.

The process is preferably carried out under conditions that provide greater constriction of the pressure molded layer than that of the liner, particularly during cooling of both layers after expansion.

The injected layer and preformed liner form a composite parison which is introduced into a blow mold and expanded in unison in said blow mold to form the composite container of the present invention.

DESCRIPTION OF DRAWINGS

The nature of the invention will be better understood from the following description taken in connection with the accompanying drawings in which:

FIG. 1 is an axial section through a parison mold showing a liner and neck mold embodying the invention;

FIG. 2 is a broken sectional view of the neck forming area of a parison mold showing a further embodiment of the invention;

FIG. 3 is a transverse section taken on the line 3—3 of FIG. 2;

FIG. 4 is a broken axial section of a portion of the parison and core illustrating an undesirable air buble between the liner and the core;

FIG. 5 is a partial section of a composite parison showing the manner of sealing the liner in the plastic layer;

DETAILED DESCRIPTION

Figure 6:
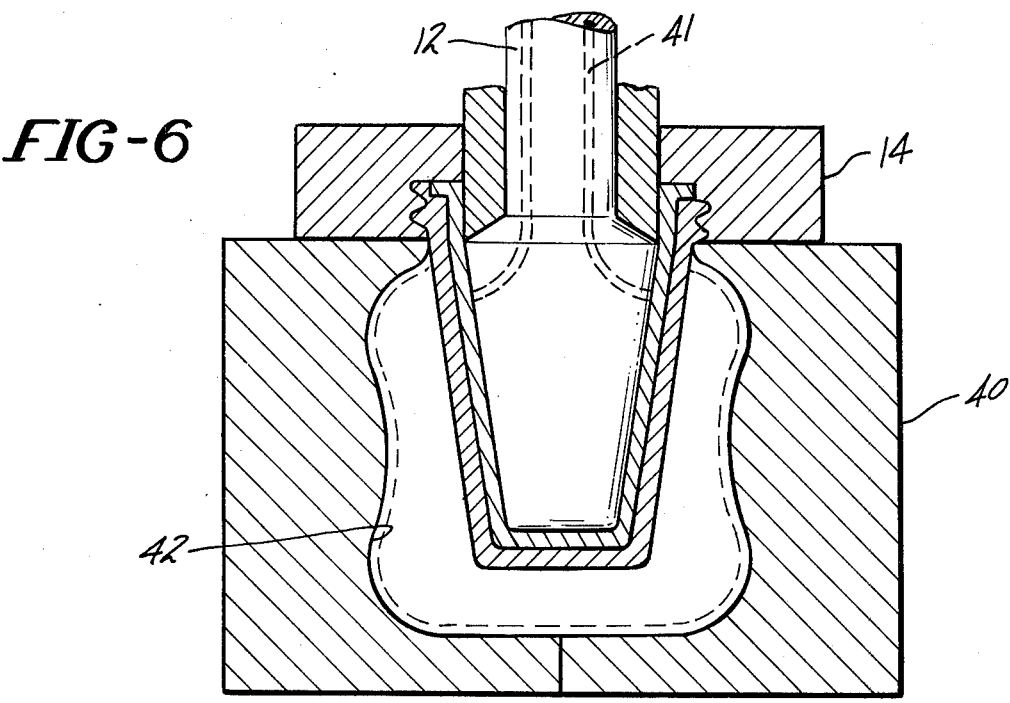
FIG. 6 is an axial section showing the blow core in blow position within the blow mold and hollow article in the blow mold cavity.
Figure 7:
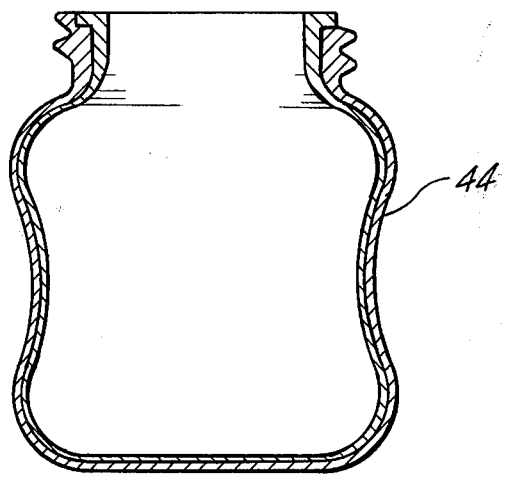
FIG. 7 shows the container of the present invention.

Referring to the drawings in more detail, a pressure molding injection assembly 10 in FIG. 1 is provided to supply hot, flowable plastic under pressure for molding the parison 16 in the parison mold 11 and around core 12 which may be a blow core. Sleeve 13 is provided around a portion of core 12, as a continuation of the latter and to form with neck mold 14 the open end or neck of the container to be molded. Prior to introducing core 12 into parison mold 11 and prior to filling the parison mold with hot plastic by means of the pressure molding assembly 10, a liner 15 is applied to blow core 12. The liner 15 is provided at its open end with an outwardly extending flange 17 which is disposed in an annular recess 18 in the neck mold 14.

In the course of filling of the mold cavity formed between juxtaposed surfaces of parison mold 11 and the core 12 with liner 15 thereon, the air contained within that cavity or between the liner and the core prior to the introduction of plastic from the pressure molding assembly 10 is compressed and forced toward the area of the neck mold 14 as the mold cavity is progressively filled. The degree of such compression depends upon the presence and size of openings through which the air may escape. If the plastic enters at a rate in excess of the possible rate of air escape, or if the plastic blocks passages through which such compressed air could escape, before substantially the entire mold cavity is filled, then regions of air will remain in isolated locations, at the surfaces of the plastic or within the plastic or between the plastic and liner, or between the liner and core, as bubbles, the air within such bubbles being compressed to a substantial degree by virtue of the pressure of the entering plastic. Such pressure may amount to a multiple, such as 100 times, atmospheric pressure, due to the fact that the plastic is under a pressure often in excess of 400 atmospheres or more as it enters the parison mold 11 under conventional molding conditions. Hence blow holes may be produced in the parison.

While defects of this kind can usually be avoided in conventional molding practice by careful design of the mold to provide suitable clearances for venting the air, these and other difficulties multiply when liners are applied within the parison mold. For example, the flange 17 of the liner 15, which is adapted to cover and protect the neck and upper rim 19 of the container to be made, may cover substantial portions of the clearance between neck mold 14 and core 12 and its surrounding sleeve 13. In the absence of the liner 15, that clearance, i.e., the difference in dimension between the mating surfaces of neck mold 14 and sleeve 13 can be made sufficient to allow for air escape without the plastic entering therein and thereby clogging the clearance. Covered by the liner flange, the clearance may become ineffective and air tend to be trapped fortuitously and at random locations in the mold. As a consequence, when the composite parison is blown into its final shape any air bubble entrapped between the liner 15 and the pressure molded plastic layers continues to exert pressure between the two layers of plastic in excess of atmospheric pressure and thereby the two layers will tend to separate, at times rapidly and excessively.

Another common defect caused by insufficient removal of air is produced by the heating of the air under sudden compression by the entering plastic which may be sufficient to scorch localized spots of the plastic, producing an unsightly or mechanically weak region in the finished product.

Care must be taken to avoid accidental, irregular spaces between the liner 15 and the core 12 in the path of the plastic stream. For example, the air trapped between the core 12 and the liner 15 may produce the bubble 20, as indicated in exaggerated form in FIG. 4, which bubble insulates liner 15 locally from the core, rendering it less deformable than the rest of the liner; it also leaves that portion of the liner unsupported against the pressure of the oncoming plastic. In consequence, the liner may be damaged or ruptured and the air below the bubble 20 may be randomly displaced, but not removed. To avoid such occurrence, the core 12 and the liner 15 are designed to have closely matching surfaces that cause the liner to be pressed into even better conformance with the core as the plastic enters the parison mold, as for example, by means of matching tapered surfaces, the taper being preferably in excess of 7½°.

In order to avoid these difficulties, the neck mold 14 is provided with a plurality of passages 21 which extend axially of the neck mold and communicate with the annular recess 18 near its outer periphery. Such passages 21 may be spaced around the periphery of the neck mold as required. These passages serve as vents for any air which is forced along the parison mold from the space between the sleeve 15 and the core 12, or the space between the sleeve 15 and the plastic. The flange 17 is sufficiently flexible to permit such air to pass outwardly through the vents 21. Additional vent means for the air trapped between the sleeve 15 and the core 12 may be provided by suitable clearance between the neck mold 14 and the sleeve 13 of the core 12, or by scoring or grooving the contacting surfaces in the manner which is known in the art.

Thus, in accordance with the process of the present invention the air is progressively vented and the liner is progressively conformed to the core during the injection step. This avoids the problems noted heretofore and represents a considerable advantage when the composite parison is subsequently expanded in the blow mold.

As disclosed in my U.S. Pat. No. 3,719,735, it is possible to remove air that may be entrapped between the core and the liner by means of vacuum suction applied through the core. However, the air remaining between the liner and the plastic that is pressure molded around it cannot be removed by such vacuum suction. Therefore, the air between the liner and molded plastic must be progressively vented at a rate determined by the progress of filling of the parison mold.

In order to prevent air from subsequently entering between the plastic layer 16 and the liner 15 in the finished article, the flange 17 is adhered to or sealed to the end surface of the rim 19 of the plastic layer. In order to produce a more effective seal, the flange 17 may be provided with a downwardly extending lip 17a which is embedded in and sealed to the rim 19 of the article as indicated in FIG. 5.

In the embodiment of FIGS. 2 and 3, the sleeve 13a is provided with a shoulder 25 and a correspondingly enlarged peripheral portion 26 which is tapered outwardly and is adapted to seat in the correspondingly tapered peripheral portion 27 of the neck ring 14a. In this form, the flange 17 of the liner engages the shoulder 25 which forms an end enclosure for the mold cavity.

At instances where sufficient venting is not otherwise obtainable, in the mold shown in FIGS. 2 and 3 the sleeve 13a may be provided with a plurality of passages 30 which are peripherally displaced therearound and terminate at the shoulder 25 to communicate with the space between the liner 15 and the core 12. A series of passages 31 are provided in the neck ring 14a in a position to communicate with the space below the flange 17 so as to vent the air which may be trapped by the plastic layer 16.

The removal of the air may be facilitated by connecting the passages 30 or 31, or both sets of passages to a suitable source of suction (not shown). It is also to be understood that air may escape in any space between the flared surfaces 26 and 27, which may be scored or grooved if desired. The passages 31 in the sleeve 13a may be omitted if sufficient venting area is obtained between said surfaces as this area is not obstructed in the form shown in FIGS. 2 and 3 by the flange 17 of the liner.

In order to prevent obstruction of the passages 30 by the flange 17, the flange may be held spaced from the surface of the shoulder 25 as by means of radial ribs 32, as shown in FIG. 3. The spaces between ribs 32 may be connected by an annular passage formed by grooves 33 in the ribs 32. The arrangement of ribs 32 at the location shown is intended to serve merely as an example illustrating one means of providing clearance around the extremity of the liner for the escape of air in the zone last to be filled by the plastic entering the parison mold.

By thus avoiding entrapment of air between the liner and the pressure molded portion of the parison, close adherence of the liner to the plastic in the finished blown article is obtained because, upon expansion of the composite parison, atmospheric pressure continues to press the two layers together.

In order for the layers to separate under the conditions here described, in the absence of air therebetween to begin with, a pressure in excess of atmospheric would have to be exerted between the liner and the plastic which is seldom the case under the conditions of use of the finished articles.

To further preserve these conditions, beyond the time of manufacture of the articles, it is useful to take measures to prevent peeling apart of the two layers at the extremity, e.g., the open end, or rim of the container.

The sealing of the flange 17 to the rim of the plastic prevents separation of the liner at its open end and thus precludes the entrance of air at this point.

After forming the parison by injection, the blow core 12 is removed from the parison mold together with neck ring 14 and with the parison thereon. It is next inserted into the blow mold 40 as shown in FIG. 6. As the next step, pressure fluid, usually compressed air, is admitted through fluid passages 41 and the parison is expanded into the blow mold 40 to assume the shape of the blow mold cavity 42, as indicated by dotted lines in FIG. 6. Fluid pressure is maintained until the blown article cools sufficiently in contact with the walls of the blow mold 40 to be removed therefrom to provide composite container 44. It can be seen that the air removal of the present invention and the conforming of the liner to the core offers considerable advantages in the uniformity of product upon subsequent expansion.

In some instances, it may be desirable to remove the finished composite parison from the core and to store or ship the same before it is blown into the form of the finished article. In that case, the composite parison must be heated to the proper temperature prior to the blowing operation. In order to avoid any possibility of separation of the liner from the plastic walls due to differences in expansion characteristics or for other reasons, the parison may be kept under internal pressure during the heating step and until the blowing of the same into the form of the finished article is completed. for this purpose, the parison may be maintained under internal fluid pressure or may be placed on a suitable support such as a stem which fits closely therein. Such reheating is usually unnecessary if the parison is transferred on the blow core into the blow mold before cooling to a temperature below that at which the blowing step can be efficiently carried out.

By the method and means herein described, a composite container is produced consisting of more than one layer, in which the layers are in full conformance with each other, but not necessarily bonded, such as by welding or chemically, and in which such conformance is maintained primarily by the atmospheric pressure acting upon the layers. In consequence each of the layers preserves its mechanical properties independent of the other. Thus, if the liner is ductile and the outer layer brittle, a force and deformation sufficient to cause a crack in said outer layer will not necessarily rupture the liner as well. It is known that many containers are subject to mechanical damage, such as during filling and transport, while containing liquids or paste-like substances. The ability of the liner to remain whole during such damage, even if the outer layer should break, prevents spillage and consequent damage to filling and transportation apparatus.

The composite article thus produced is characterized by layers having different physical properties which are so disposed that the respective properties may fully benefit the finished article without one of the layers detracting from the properties of another layer. For example, the outer layer may be of relatively substantial thickness and made of a strong and inexpensive plastic, such as polystyrene or linear polyethylene. While having sufficient strength to serve as a holder and protector for the inner layer so long as the latter is fully conformed thereto, as by avoidance of air entrapment between the layers, such outer layer will have limited capability to blend or otherwise deform and may exhibit a degree of brittleness. The inner layer is usually very thin and film-like, made of a plastic design to protect the contents, such as against oxidation, or to protect the outer layer, such as against solvent attack. Such inner layer may, for example, be made of an acrylonitrile polymer, or of polyvinylidine chloride, or polyethylene film and may accordingly exhibit limited strength, but substantially greater impact resistance than the outer layer. The inner layer, while relatively thin, can be self-sustaining and hold the contents of the container, particularly when backed by the relatively thick outer layer. Even though the outer layer may be somewhat brittle and tend to produce cracks when damaged, such defects are not passed through to the self-supporting inner layer which is backed by the outer layer but is not bonded thereto over its entire extent.

Accordingly, the relative brittleness of the outer layer leaves the inner layer unaffected and the flexibility of the inner layer is not impaired by the fact that the outer layer can participate in deflection and bending only to a limited extent.

Thus the selection of the properties of the total composite article is facilitated because the individual layers can be made to preserve their individual properties, as desired, and measures may be taken to avoid damage to at least one of the layers during their combined use.

It can be seen that the preformed sleeve and the pressure molded layer are subjected to heating and cooling in accordance with the temperatures at which the various operations are carried out. Therefore, the layers will expand and contract to a degree corresponding to the respective temperatures, in keeping with the expansion characteristic of the respective materials. Should the outer layer expand more than the inner layer, or should the inner layer contract more than the outer layer, then separation of the layers would tend to occur. Normally, the tendency to separate due to such differences in expansion properties will be counteracted by atmospheric pressure only if the difference between the expansions or contractions of the layers is minimal.

In the absence of any other means to avoid or to minimize separation, it is necessary to carefully match the heat expansion characteristics of the materials. Naturally, this represents a severe disadvantage as it limits the choice of the materials that may be employed. In addition to the other advantages of the present invention, it is a significant advantage that substantial mismatch in expansion and contraction coefficients may be tolerated. This is accomplished by conducting the individual process steps in such a manner that the outer, pressure molded layer exhibits greater total contraction during and/or after the process steps than the liner, particularly whenever the liner is not in close contact with the core, for example, during blowing, cooling in the blow mold and removal therefrom.

It will be understood that the well known characteristic commonly termed the "thermal expansion coefficient" is not by itself sufficient to define the contraction behavior of a molded article in the course of its molding operation. The latter contraction is usually termed "mold shrinkage," denoting that amount by which a unit length of said article decreases as the article is molded, i.e., while it transgresses the temperature range from that of the molten plastic furnished to the mold under pressure to that of the finished, cooled article. Mold shrinkage depends not only on the thermal expansion coefficient, but also on the conditions of molding, for example, the temperature of the molten plastic, the rate of filling of the mold and the mechanical constraints given by the mold together with the rate of cooling therein.

Examples of thermal expansion coefficients and of mold shrinkages are given in the literature, as in the Modern Plastics Encyclopedia, Vol. 48 No. 10A, published by McGraw Hill, October, 1971.

In accordance with the present invention, in addition to the process which avoids air entrapment in order to render cohesion by atmospheric pressure effective, the molding process is conducted in such a manner that the total shrinkage of the pressure molded layer exceeds that of the liner at all times, even when the thermal expansion coefficient of the liner exceeds that of the pressure molded layer. This can be accomplished by means of appropriate adjustment of the melt temperature and by corresponding temperature control of the core and of the blow mold. It can be recognized that this is a significant advantage.

It should be noted that the thermal expansions coefficients usually reported in tables, such as the one referred to above, are accurate only within a limited range of temperatures. In the range of elevated temperatures, particularly also those during the molten condition, the respective coefficients are at considerable variance therefrom, as is well known in the literature. For example, plastics that remain substantially amorphous experience a major change in contraction characteristics when cooled from the viscous liquid to the glassy state, i.e., while transgressing the so-called hardening (or, in reverse, the softening) point, as for example described on pp. 120 to 123 of Mechanical Behavior of High Polymers, by Turner Alfrey, Jr., published by Interscience Publishers, New York, 1948. Similarly, a major change occurs in crystalline plastics when they transgress from the viscous-liquid to the crystalline state.

In the process of the present invention, the blow core and the pressure molded outer layer necessarily heats the liner to a temperature that renders it capable of deformation by stretching or blowing. The plastic of the outer layer is itself heated to a temperature sufficient to render it capable of being pressure molded. The latter temperature is in most instances, but not necessarily always, higher than the former. It will be understood that neither temperature is limited to a single, specific value in any given molding process. Instead, a reasonable range may always be accommodated. For example, blowing of the liner will usually succeed within a temperature range of ± 10° F. and pressure molding with a range of ± 20° F.

In accordance with the present invention, the pressure molding temperature is chosen in such a manner that the outer layer will contract to a greater degree than the liner and thereby place the liner under compression at all stages of the process. Thus, advantage may be taken, in combination, of the thermal contraction of the pressure molded layer, including the one in transition from the viscous, i.e., fluid, to solid state as it cools in the parison mold, but mostly in the blow mold, and also of the fact that the said layer so contracts over a substantially greater temperature range (and therefore to a greater extent) than the liner. The liner needs to be heated only enough to be deformed in the solid, non-fluid condition.

Hence, it will be seen that the liner is under compression in the parison as well as in the stretched or blown article. Therefore, in the simultaneous absence of air between layers, as described herein, separation of the layers is virtually impossible, except by deliberate means.

It is, thus, a significant advantage of the present invention that substantial mismatch in expansion coefficients may be tolerated. It is only required that the total shrinkage of the outer layer be greater than that of the inner layer in the manner indicated above, the degree of difference not being significant. This affords a great deal of versatility to the process of the present invention and affords one a choice of components not available heretofore.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In the process of forming a composite plastic article from a parison having at least two layers of material wherein the parison is formed on a core in a parison mold by molding the organic plastic material around the core in the parison mold cavity and wherein the parison is subsequently expanded in a blow mold, the steps which comprise applying a preformed liner to said core, said liner having substantially continuous side and end portions which conform to the sides and end of the core and prevent direct contact between the core and plastic being molded therearound, subsequently pressure molding an outer layer of organic plastic material around said liner substantially enclosing said liner to form a composite parison by injecting plastic into said mold cavity around said core and liner and causing the injected plastic to fill the space therearound in a manner such that substantially all air in said mold cavity in the space between said core and liner and between the liner and the injected plastic is forced toward the portion last to be filled, venting such air from said portion, bringing said liner to a temperature at which it is capable of being expanded together with said outer layer, at least in part by means of said outer layer, introducing said liner and outer layer into a blow mold in said heated state, and expanding said liner and outer layer in unison to form a multilayered hollow article.

2. The process according to claim 1 in which the liner is held firmly against the plastic by the ambient air pressure.

3. The process of claim 1 wherein such air is progressively vented from the portion last to be filled during the injection of plastic.

4. The process of claim 3 wherein the liner is progressively conformed to the core during the injection of plastic.

5. The process of claim 1 in which the liner is selected from the group consisting of acrylonitrile, polyvinylidene chloride and polyethylene.

6. The process of claim 1 in which said plastic is selected from the group consisting of polyethylene and polystyrene.

7. The process of claim 3 in which the air is progressively vented through a plurality of passages.

8. The method of claim 1 in which the liner is sealed to the plastic layer at its open end so as to prevent displacement of the liner by the entrance of air between the liner and the plastic layer.

9. The method of claim 1 including the step of applying suction to said mold cavity during the injection of plastic to assist in progressively venting the air.

10. The method of claim 1 wherein the total shrinkage of the injected plastic is greater than that of the liner.

11. The method of claim 10 wherein the thermal expansion coefficient of the liner exceeds that of the pressure molded layer.

12. The method of claim 10 wherein the molding process is controlled so that the total shrinkage of the injected plastic is greater than that of the liner.

13. The method of claim 1 wherein the plastic is injected into the mold cavity at a temperature so that the injected plastic will contract to a greater degree than the liner and place the liner under compression.

14. The method of claim 13 wherein the liner is under compression in the mold cavity, in the blow mold and in the final article.

* * * * *